US009882916B2

(12) United States Patent
Hu

(10) Patent No.: US 9,882,916 B2
(45) Date of Patent: *Jan. 30, 2018

(54) METHOD FOR VERIFYING SENSITIVE OPERATIONS, TERMINAL DEVICE, SERVER, AND VERIFICATION SYSTEM

(71) Applicant: Tencent Technology (Shenzhen) Company Limited, Shenzhen, Guangdong (CN)

(72) Inventor: Shuai Hu, Guangdong (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 91 days.

This patent is subject to a terminal disclaimer.

(21) Appl. No.: 14/755,232

(22) Filed: Jun. 30, 2015

(65) Prior Publication Data
US 2015/0312265 A1 Oct. 29, 2015

Related U.S. Application Data

(63) Continuation of application No. PCT/CN2013/088555, filed on Dec. 4, 2013.

(30) Foreign Application Priority Data

Jan. 11, 2013 (CN) .......................... 2013 1 0011236

(51) Int. Cl.
G06F 7/04 (2006.01)
H04L 29/06 (2006.01)

(52) U.S. Cl.
CPC ............. H04L 63/12 (2013.01); H04L 63/08 (2013.01); H04L 63/18 (2013.01)

(58) Field of Classification Search
None
See application file for complete search history.

(56) References Cited

U.S. PATENT DOCUMENTS

| 2006/0080702 A1* | 4/2006 | Diez | A63F 13/12 |
| | | | 725/30 |
| 2007/0220597 A1* | 9/2007 | Ishida | G06Q 20/12 |
| | | | 726/8 |
| 2013/0256400 A1* | 10/2013 | Eschbach | G06Q 50/00 |
| | | | 235/375 |

FOREIGN PATENT DOCUMENTS

| CN | 1784063 | 6/2006 |
| CN | 102289726 | 12/2011 |

(Continued)

OTHER PUBLICATIONS

Office Action issued in corresponding CN Application No. CN201310011236.0 dated Jan. 21, 2016.

(Continued)

*Primary Examiner* — Brandon Hoffman
(74) *Attorney, Agent, or Firm* — Dilworth & Barrese, LLP.; Michael J. Musella, Esq.

(57) ABSTRACT

The disclosure, pertaining, to the field of network technologies, discloses a method for verifying sensitive operations, a terminal device, a server, and a verification system. The method includes: receiving by a verification server, a second verification request from a sensitive operation server; sending, by the verification server, a verification code to a two-dimensional code server; upon receiving a first verification request from a first terminal device, performing verification by the verification server according to the verification information of the first terminal device and the information in the two-dimensional code; and when the user initiating the sensitive operation is a user determined by the identity information, allowing a sensitive operation initiated by the user determined according to the information in the two-dimensional code.

22 Claims, 7 Drawing Sheets

(56) References Cited

FOREIGN PATENT DOCUMENTS

CN 102752444 A 10/2012
KR 20020004128 1/2002

OTHER PUBLICATIONS

International Search Report for PCT/CN2013/088555 dated Jan. 18, 2014.

\* cited by examiner

METHOD FOR VERIFYING SENSITIVE OPERATIONS, TERMINAL DEVICE, SERVER, AND VERIFICATION SYSTEM

CROSS REFERENCE TO RELATED APPLICATIONS

This application is a continuation of International Patent Application No. PCT/CN2013/088555, filed Dec. 4, 2013, which application was published on Jul. 17, 2014, as WO2014/108003, and further claims priority to Chinese Patent Application No. 201310011236.0 filed before Chinese Patent Office on Jan. 11, 2013 and entitled "METHOD FOR VERIFYING SENSITIVE OPERATIONS, TERMINAL DEVICE, SERVER, AND VERIFICATION SYSTEM", which are incorporated herein by reference in their entireties.

TECHNICAL FIELD

The disclosure relates to the field of network technologies, and in particular, to a method for verifying sensitive operations, a terminal device, a server, and a verification system.

BACKGROUND

With the development of Internet-based applications, such services as Internet-based shopping, Internet-based games, and Internet-based transactions are being pushed to users. Accounts of users for logging in to such Internet-based applications are becoming high-valued. Thefts of user's accounts and various virtual properties run wild, causing challenges to security of users accounts and virtual properties. In view of the above, when users log in to the Internet-based applications using the accounts, carry out payment, conduct virtual property transactions, it is an indispensable step to verify real identities of the users.

Currently, identity verification is implemented mainly by entering a pre-registered static or dynamic password by a user on a computer or a terminal of a other form. In this verification mode, the static password and the dynamic password are both subject to a risk of being stolen from the user by a third party (stealer) by means of Trojan virus or by other means. In addition, this verification mode increases user's learning cost and operation cost.

SUMMARY

Embodiments of the disclosure provide a method for verifying sensitive operations, a terminal device, a server, and a verification system. The technical solutions are as follows:

An embodiment of the disclosure provides a method for verifying sensitive operations, including:

receiving, by a verification server, a second verification request from a sensitive operation server, the second verification request carrying verification scenario information and login, information of a user initiating a sensitive operation;

sending, by the verification server, a verification code to a two-dimensional code server, such that the two-dimensional code server generates a two-dimensional code according to the verification scenario information, the login information of the user initiating the sensitive operation, and the verification code. Information in the two-dimensional code being at least used for uniquely determining the sensitive operation and the user initiating the sensitive operation; and upon receiving a first verification request from a first terminal device, the first verification request carrying verification information of the first terminal device and the information in the two-dimensional code, performing verification by the verification server according to the verification information of the first terminal device and the information in the two-dimensional code, the verification information being used for determining identity information; and when the user initiating the sensitive operation is a user determined according to the identity information, allowing a sensitive operation initiated by the user, which is determined according to the information in the two-dimensional code.

The performing verification by the verification server according to the verification information of the first terminal device and the information in the two-dimensional code includes:

judging, by the verification server according to the login information of the user initiating the sensitive operation and the verification information, whether the login information of the user initiating the sensitive operation is bound to the verification information, if true, judging that the user initiating the sensitive operation is the user determined according to the identity information, and otherwise, judging that the user initiating the sensitive operation is not the user determined according to the identity information.

Prior to the receiving, by a verification server, a second verification request from a sensitive operation server, the method further includes:

registering the identity information and the verification information of the first terminal device to determine a binding relationship between the identity information and the verification information.

The information in the two-dimensional code includes at least one of: organization information, service identifier information, verification scenario information, two-dimensional code identifier information.

The information in the two-dimensional code further includes a website link relevant to or irrelevant to verification of the sensitive operation.

After the performing verification by the verification server according to the verification information of the first terminal device, the method includes:

respectively sending a verification result to the first terminal device and/or a second terminal device initiating a sensitive operation, such that the first terminal device and the second terminal device initiating a sensitive operation display a processing result of the sensitive operation according to the verification result.

An embodiment of the disclosure provides a method for verifying sensitive operations, including:

receiving, by a two-dimensional code server, a second verification request from a sensitive operation server, the second verification request carrying verification scenario information and login information of a user initiating a sensitive operation; and receiving, by the two-dimensional code server, a verification code from a verification server, and generating a two-dimensional code according to the verification scenario information, the login information of the user initiating the sensitive operation, and the verification code, information in the two-dimensional code being at least used for uniquely determining the sensitive operation and the user initiating the sensitive operation; and The login information is account information or a user identifier.

The information in the two-dimensional code includes a least one of: organization information, service identifier information, verification scenario information, two-dimensional code identifier information.

The information in the two-dimensional code further includes a website link relevant to or irrelevant to verification of the sensitive operation.

An embodiment of the disclosure provides a method for verifying sensitive operations, including:

scanning, by a first terminal device, a two-dimensional code for initiating a sensitive operation to acquire information in the two-dimensional code, the information in the two-dimensional code being at least used for uniquely determining the sensitive operation and the user initiating the sensitive operation; and sending, by the first terminal device, a first verification request to a verification server, the first verification request carrying verification information of the first terminal device and the information in the two-dimensional code, such that the verification server performs verification according to the verification information of the first terminal device and the information in the two-dimensional code, the verification information being used for determining identity information; and when the user initiating the sensitive operation is a user determined by the identity information, allowing a sensitive operation initiated by the user, which is determined according to the information in the two-dimensional code.

Prior to the scanning, by a first terminal device, a two-dimensional code for initiating a sensitive operation, the method further includes:

registering the identity information and the verification information of the first terminal device to determine a binding relationship between the identity information and the verification information.

The verification information of the first terminal device includes at least one of: a user identifier, an identifier of the first terminal device, and an application identifier of the first terminal device.

The two-dimensional code is provided by a second terminal device initiating a sensitive operation.

The information in the two-dimensional code includes at least one of organization information, service identifier information, verification scenario information, two-dimensional code identifier information.

The information in the two-dimensional code further includes a website link relevant to or irrelevant to verification of the sensitive operation.

After the sending, by the first terminal device, a first verification request to a verification server, the method further includes:

receiving, by the first terminal device, a verification result from the verification server, and displaying a processing result of the sensitive operation on the first terminal device and/or the second terminal device according to the verification result.

An embodiment of the disclosure provides a method for verifying sensitive operations, including:

sending, by a second terminal device, a sensitive operation request to a sensitive operation server, the sensitive operation request carrying at least verification scenario information and login information of a user initiating a sensitive operation, such that the sensitive operation server respectively sends a second verification request to a two-dimensional code server and a verification server, the second verification request carrying the verification scenario information and the login information of the user initiating the sensitive operation, such that the verification server sends a verification code to the two-dimensional code server, whereupon the two-dimensional code server generates a two-dimensional code according to the verification scenario information, the login information of the user initiating the sensitive operation, and the verification code.

The sensitive operation request further carries organization information and service identifier information.

The information in the two-dimensional code includes at least one of: organization information, service identifier information, verification scenario information, two-dimensional code identifier information.

The information in the two-dimensional code further includes a website link relevant to or irrelevant to verification of the sensitive operation.

After the sending, by a second terminal device, a sensitive operation request to a sensitive operation server, the method further includes:

receiving, by the second terminal device, a verification result from the verification server, and displaying a processing result of the sensitive operation on a first terminal device and/or the second terminal device according to the verification result.

An embodiment of the disclosure provides a method for verifying sensitive operations, including:

receiving, by a sensitive operation server, a sensitive operation request from a second terminal device, the sensitive operation request carrying at least verification scenario information and login information of a user initiating a sensitive operation; and respectively sending, by the sensitive operation server, a second verification request to a two-dimensional code server and a verification server, the second verification request carrying the verification scenario information and the login information of the user initiating the sensitive operation, such that the verification server sends a verification code to the two-dimensional code server, whereupon the two-dimensional code server generates a two-dimensional code according to the verification scenario information, the login information of the user initiating the sensitive operation, and the verification code.

The login information is account information or a user identifier.

The sensitive operation request further carries organization information and/or service identifier information.

An embodiment of the disclosure provides a verification server, including:

a second verification request receiving module, configured to receive a second verification request from a sensitive operation server, the second verification request carrying verification scenario information and login information of a user initiating a sensitive operation;

a verification code sending module, configured to send a verification code to a two-dimensional code server, such that the two-dimensional code server generates a two-dimensional code according to the verification scenario information, the login information of the user initiating the sensitive operation, and the verification code, information in the two-dimensional code being at least used for uniquely determining the sensitive operation and the user initiating the sensitive operation; and a verifying module, configured to: upon receiving a first verification request from a first terminal device, the first verification request carrying verification information of the first terminal device and the information in the two-dimensional code, perform verification according to the verification information of the first terminal device and the information in the two-dimensional code, the verification information being used for determining identity information; and when the user initiating the sensitive operation is a user determined according to the identity information, allow a sensitive operation initiated by the user, which is determined according to the information in the two-dimensional code.

The verifying module is configured to judge, according to the login information of the user initiating the sensitive operation and the verification information, whether the login information of the user initiating the sensitive operation is bound to the verification information; if pale, judge that the user initiating the sensitive operation is the user determined according to the identity information; and otherwise, judge that the user initiating the sensitive operation is not the use determined according to the identity information.

The verification server further includes:

a registering module, configured to register the identity information and the verification information of the first terminal device to determine a binding relationship between the identity information and the verification information.

The information in the two-dimensional code includes at least one of organization information, service identifier information, verification scenario information, two-dimensional code identifier information.

The information in the two-dimensional code further includes a website link relevant to or irrelevant to verification of the sensitive operation.

The server further includes:

a verification result sending module, configured to respectively send a verification result to the first terminal device and/or a second terminal device initiating a sensitive operation, such that the first terminal device and the second terminal device initiating a sensitive operation display a processing result of the sensitive operation according to the verification result.

An embodiment of the disclosure provides a two-dimensional code server, including:

a second verification request receiving module, configured to receive a second verification request from a sensitive operation server, the second verification request carrying verification scenario information and login information of a user initiating a sensitive operation;

a verification code receiving module, configured to receive a verification code from a verification server; and a two-dimensional code generating module, configured to generate a two-dimensional code according to the verification scenario information, the login information of the user initiating the sensitive operation, and the verification code, information in the two-dimensional code being at least used for uniquely determining the sensitive operation and the user initiating the sensitive operation.

The login information is account information or a user identifier.

The information in the two-dimensional code includes at least one of organization information, service identifier information, verification scenario information, two-dimensional code identifier information.

The information in the two-dimensional code further includes a website link relevant to or irrelevant to verification of the sensitive operation.

An embodiment of the disclosure provides a terminal device, including:

a scanning module, configured to scan a two-dimensional code for initiating a sensitive operation to acquire information in the two-dimensional code, the information in the two-dimensional code being at least used for uniquely determining the sensitive operation and the user initiating the sensitive operation; and a first verification request sending module, configured to send a first verification request to a verification server, the first verification request carrying verification information of the terminal device and the information in the two-dimensional code, such that the verification server performs verification according to the verification information of the terminal device and the information in the two-dimensional code, the verification information being used for determining identity information; and when the user initiating the sensitive operation is a user determined according to the identity information, allow a sensitive operation initiated by the user, which is determined according to the information in the two-dimensional code.

The terminal device further includes:

a registering module, configured to register the identity information and the verification information of the terminal device to determine a binding relationship between the identity information and the verification information.

The verification information of the terminal device includes at least one of: a user identifier, an identifier of the terminal device, and an application identifier of the terminal device.

The two-dimensional code is provided by a second terminal device initiating a sensitive operation.

The information in the two-dimensional code includes at least of: organization information, service identifier information, verification scenario information, two-dimensional code identifier information.

The information in the two-dimensional code further includes a website link relevant to or irrelevant to verification of the sensitive operation.

The terminal device further includes:

a processing result displaying module, configured to receive a verification result from the verification server, and display a processing result of the sensitive operation on the terminal device and/or the second terminal device according to the verification result.

An embodiment of the disclosure provides a terminal device, including:

a sensitive operation request sending module, configured to send a sensitive operation request to a sensitive operation server, the sensitive operation request carrying at least verification scenario information and login information of a user initiating a sensitive operation, such that the sensitive operation server respectively sends a second verification request to a two-dimensional server and a verification server, the second verification request carrying the verification scenario information and the login information of the user initiating the sensitive operation, such that the verification server sends a verification code to the two-dimensional code server, whereupon the two-dimensional code server generates a two-dimensional code according to the verification scenario information, the login information of the user initiating the sensitive operation, and the verification code.

The sensitive operation request further carries organization information and service identifier information.

The information in the two-dimensional code includes at least one of organization information, service identifier information, verification scenario information, two-dimensional code identifier information.

The information in the two-dimensional code further includes a website link relevant to or irrelevant to verification of the sensitive operation.

The terminal device further includes:

a processing result displaying module, configured to receive a verification result from the verification server, and display a processing result of the sensitive operation on the first terminal device and/or the terminal device according to the verification result.

An embodiment of the disclosure provides a sensitive operation server, including:

a sensitive operation request receiving module, configured to receive a sensitive operation request from a second terminal device, the sensitive operation request carrying at least verification scenario information and login information of a user initiating a sensitive operation; and a second verification request sending module, configured to respectively send a second verification request to a two-dimensional code server and a verification server, the second verification request carrying the verification scenario information and the login information of the user initiating the sensitive operation, such that the verification server sends a verification code to the two-dimensional code server, whereupon the two-dimensional code server generates a two-dimensional code according, to the verification scenario information, the login information of the user initiating the sensitive operation, and the verification code.

The login in formation is account information or a user identifier.

The sensitive operation request further carries organization information and/or service identifier information.

An embodiment of the disclosure provides a verification system, including a sensitive operation server, a verification server, and a two-dimensional code server; where:

the sensitive operation server is configured to: receive a sensitive operation request from a second terminal device, the sensitive operation request carrying at least verification scenario information and login information of a user initiating a sensitive operation; and respectively send a second verification request to the two-dimensional code server and the verification server, the second verification request carrying the verification scenario information and the login information of the user initiating the sensitive operation, such that the verification server sends a verification code to the two-dimensional code server, whereupon the two-dimensional code server generates two-dimensional code according to the verification scenario information, the login information of the user initiating the sensitive operation, and the verification code:

the verification server is configured to: receive the second verification request from the sensitive operation server, the second verification request carrying the verification scenario information and the login information of the user initiating the sensitive operation; send the two-dimensional code to the two-dimensional code server, such that the two-dimensional verification server generates the two-dimensional code according to the verification scenario information, the login information of the user initiating the sensitive operation, and the verification information, the information in the two-dimensional code being at least used for uniquely determining the sensitive operation and the user initiating the sensitive operation; upon receiving a first verification request from a first terminal device, the first verification information carrying verification of the first terminal device and the information in the two-dimensional code, perform verification according to the verification information of the first terminal device and the information in the two-dimensional code, the verification information being used for determining identity information: and when the user initiating the sensitive operation is a user determined according to the identity information, allow a sensitive operation initiated by the user, which is determined according to the information in the two-dimensional code; and the two-dimensional code server is configured to: receive the second verification request from the sensitive operation server, the second verification request carrying the verification scenario information and the login information of the user initiating the sensitive operation; receive the verification code from the verification server; and generate the two-dimensional code according to the verification scenario information, the login information of the user initiating the sensitive operation, and the verification code, the information in the two-dimensional code being at least used for uniquely determining the sensitive operation and the user initiating the sensitive operation.

According, to the technical solutions provided in the disclosure, terminal device verification and identity verification are introduced to and combined with a traditional verification manner using a two-dimensional code, greatly simplifying user's operations; during operation by the user, user identity is further verified, effectively improving security assurance, preventing counterfeit of user's account and leakage of user's privacy, and simplifying the process of a sensitive operation.

BRIEF DESCRIPTION OF THE DRAWINGS

For a better understanding of the technical solutions in the embodiments of the disclosure, the accompanying drawings for illustrating the embodiments are briefly described below. Apparently, the accompanying drawings in the following description illustrate only some embodiments of the disclosure, and persons of ordinary skill in the art may derive other accompanying drawings based on these accompanying drawings without any creative efforts.

DETAILED DESCRIPTION

To make the objectives, technical solutions, and advantages of the disclosure clearer, the embodiments of the disclosure are described in detail below with reference to the accompanying drawings.

Figure 1:
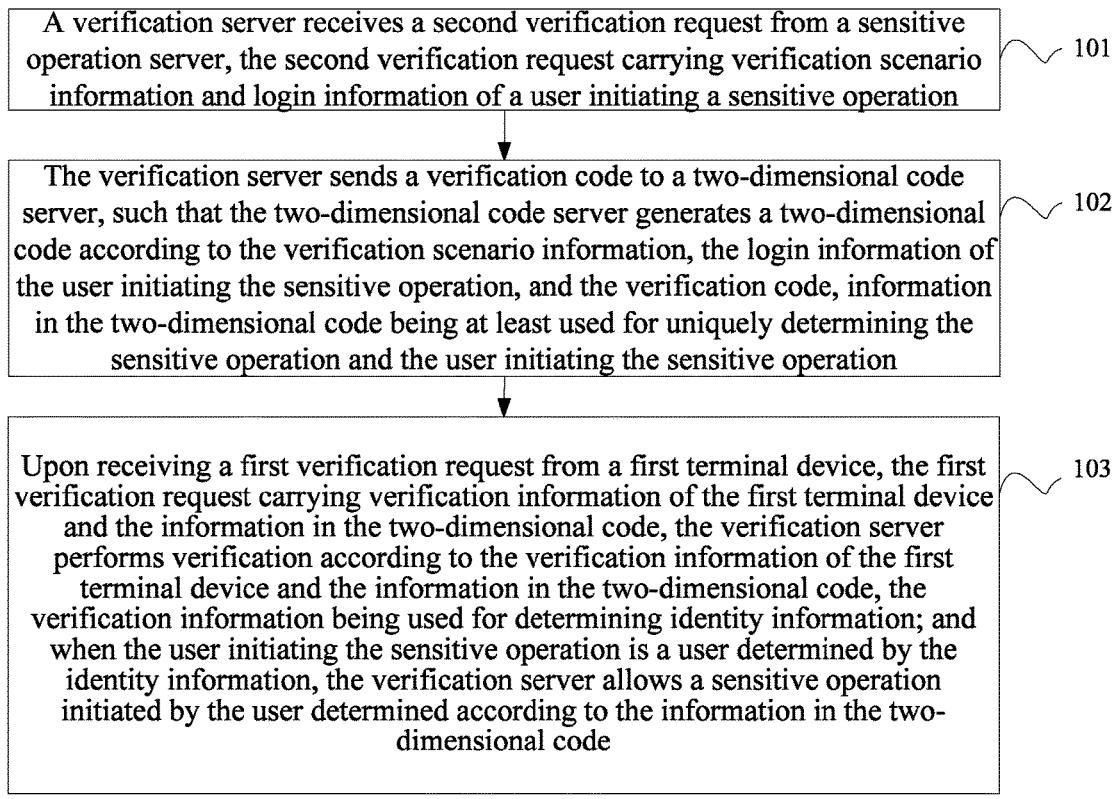
FIG. 1 is a flowchart of a method for verifying sensitive operations according to an embodiment of the disclosure.

FIG. 1 is a flowchart of a method for verifying sensitive operations according to an embodiment of the disclosure. Referring to FIG. 1, the method according to this embodiment specifically includes:

Step 101: receiving, by a verification server, a second verification request from a sensitive operation server, the second verification request carrying verification scenario information and login information of a user initiating a sensitive operation;

Step 102: sending, by the verification server, a verification code to a two-dimensional code server, such that the two-dimensional code server generates a two-dimensional code according to the verification scenario information, the login information of the user initiating the sensitive operation, and the verification code, information in the two-dimensional code being at least used for uniquely determining the sensitive operation and the user initiating the sensitive operation; and Step 103: upon receiving a first verification request from a first terminal device, the first verification request carrying verification information of the first terminal device and the information in the two-dimensional code, performing verification by the verification server according to the verification information of the first terminal device and the information in the two-dimensional code, the verification information being used for determining identity information; and when the user initiating the sensitive operation is a user determined by the identity information, allowing a sensitive operation initiated, by the user and determined according to the information in the two-dimensional code.

Optionally, the performing verification by the verification server according to the verification information of the first terminal device and the information in the two-dimensional code includes:

judging, by the verification server according to the login information of the user initiating the sensitive operation and the verification information, whether the login information of the user initiating the sensitive operation is bound to the verification information, if true, judging that the user initiating the sensitive operation is the user determined according to the identity information, and otherwise, judging that the user initiating the sensitive operation is not the user determined according to the identity information.

Optionally, prior to the receiving, by a verification server, a second verification request from a sensitive operation server, the method further includes:

registering the identity information and the verification information of the first terminal device to determine a binding relationship between the identity information and the verification information.

Optionally, the information in the two-dimensional code includes at least one of organization information, service identifier information, verification scenario information, two-dimensional code identifier information.

Optionally, the information in the two-dimensional code further includes a website link relevant to or irrelevant to verification of the sensitive operation.

Optionally, after the performing verification by the verification server according to the verification information of the first terminal device, the method includes:

respectively sending a verification result to the first terminal device and/or a second terminal device initiating a sensitive operation, such that the first terminal device and the second terminal device initiating a sensitive operation display a processing result of the sensitive operation according to the verification result.

According, to the technical solutions provided in the disclosure, terminal device verification and identity verification are introduced to and combined with a traditional verification manner using a two-dimensional code, greatly simplifying user's operations; during operation by the user, user identity is further verified, effectively improving security assurance, preventing counterfeit of user's account and leakage of user's account, and simplifying the process of a sensitive operation.

Figure 2:
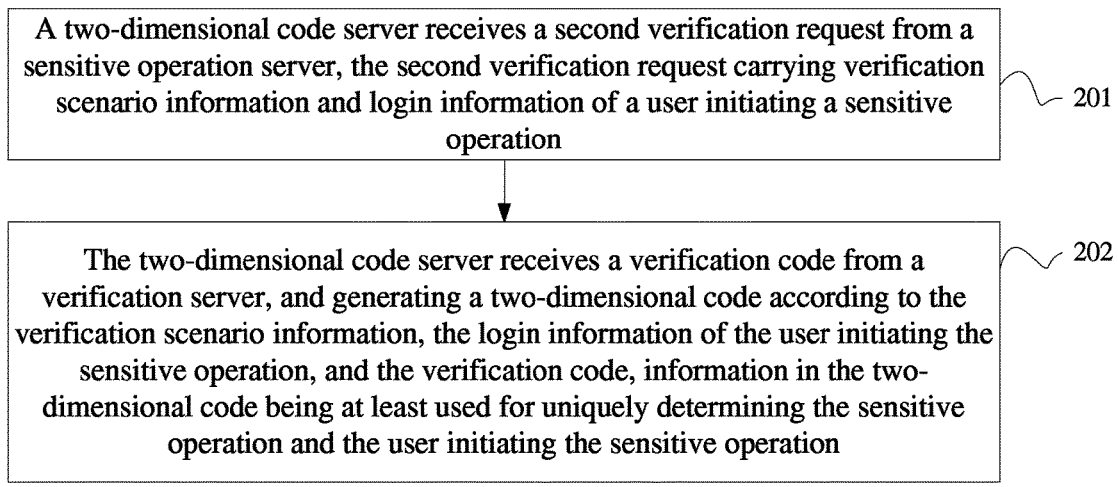
FIG. 2 is a flowchart of a method for verifying sensitive operations according to an embodiment of the disclosure.

FIG. 2 is a flowchart of a method for verifying sensitive operations according to an embodiment of the disclosure. Referring to FIG. 2, the method according to this embodiment specifically includes:

Step 201: receiving, by a two-dimensional code server, a second verification request from a sensitive operation server, the second verification request carrying verification scenario information and login information of a user initiating a sensitive operation; and Step 202: receiving, by the two-dimensional code server, a verification code from a verification server, and generating a two-dimensional code according to the verification scenario information, the login information of the user initiating the sensitive operation, and the verification code, information in the two-dimensional code being at least used for uniquely determining the sensitive operation and the user initiating the sensitive operation; and Optionally; the login information is account information or a user identifier.

Optionally, the information in the two-dimensional code includes at least one of: organization information, service identifier information, verification scenario information, two-dimensional code identifier information.

Optionally, the information in the two-dimensional code further includes a website link relevant to or irrelevant to verification of the sensitive operation.

Figure 3:
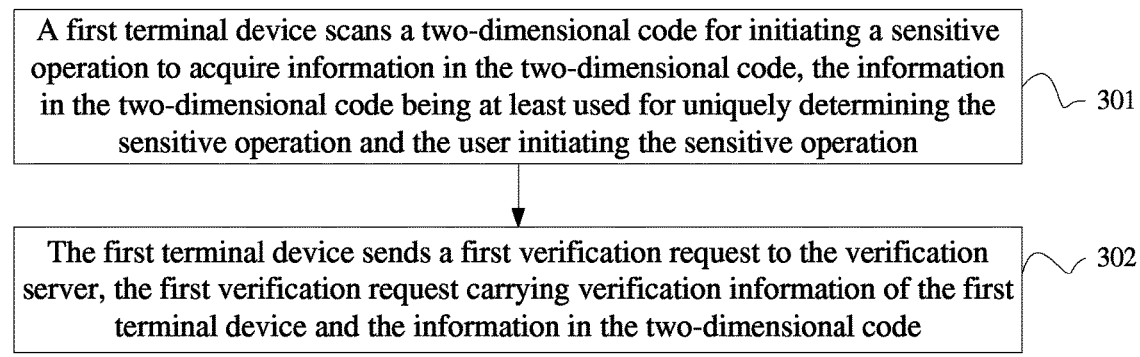
FIG. 3 is a flowchart of a method for verifying sensitive operations according to an embodiment of the disclosure.

FIG. 3 is a flowchart of a method for verifying sensitive operations according to an embodiment of the disclosure. Referring to FIG. 3, the method according to this embodiment specifically includes:

Step 301: scanning, by a first terminal device, a two-dimensional code for initiating a sensitive operation to acquire information in the two-dimensional code, the information in the two-dimensional code being at least used for uniquely determining the sensitive operation and the user initiating the sensitive operation; and Step 302: sending, by the first terminal device, a first verification request to a verification server, the first verification request carrying verification information of the first terminal device and the information in the two-dimensional code, such that the verification server performs verification according to the verification information of the first terminal device and the information in the two-dimensional code, the verification information being used for determining identity information; and when the user initiating the sensitive operation is a user determined according to the identity information, allowing a sensitive operation initiated by the user, which is determined according to the information in the two-dimensional code.

Optionally, prior to the scanning, by a first terminal device, a two-dimensional code for initiating a sensitive operation, the method further includes:

registering the identity information and the verification information of the first terminal device to determine a binding relationship between the identity information and the verification information.

Optionally, the verification information of the first terminal device includes at least one of: a user identifier, an identifier of the first terminal device, and an application identifier of the first terminal device.

Optionally, the two-dimensional code is provided by a second terminal device initiating a sensitive operation.

Optionally, the information in the two-dimensional code includes at least one of: organization information, service identifier information, verification scenario information, two-dimensional code identifier information.

Optionally, the information in the two-dimensional code further includes a website link relevant to or irrelevant to verification of the sensitive operation.

Optionally, after the sending, by the first terminal device, a first verification request to a verification server, the method further includes:

receiving, by the first terminal device, a verification result from the verification server, and displaying a processing result of the sensitive operation on the first terminal device and/or the second terminal device according to the verification result.

Figure 4:
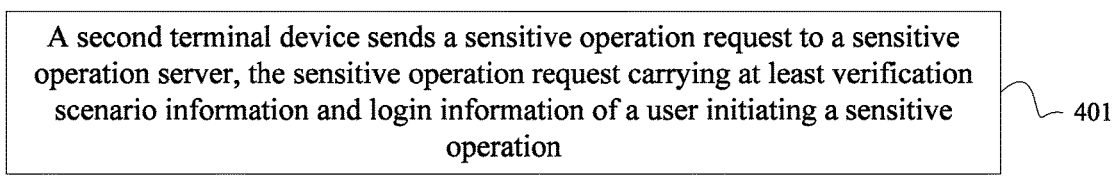
FIG. 4 is a flowchart of a method for verifying sensitive operations according to an embodiment of the disclosure.

FIG. 4 is a flowchart of a method for verifying sensitive operations according to an embodiment of the disclosure. Referring to FIG. 4, the method according to this embodiment specifically includes:

Step 401: sending, by a second terminal device, a sensitive operation request to a sensitive operation server, the sensitive operation request carrying at least verification scenario information and login information of a user initiating a sensitive operation, such that the sensitive operation server respectively sends a second verification request to a two-dimensional code server and a verification server, the second verification request carrying the verification scenario information and the login information of the user initiating the sensitive operation, such that the verification server sends a verification code to the two-dimensional code server, whereupon the two-dimensional code server generates a two-dimensional code according to the verification scenario information, the login information of the user initiating the sensitive operation, and the verification code.

Optionally, the sensitive operation request further carries organization information and service identifier information.

Optionally, the information in the two-dimensional code includes at least one of organization information, service identifier information, verification scenario information, two-dimensional code identifier information.

Optionally, the information in the two-dimensional code further includes a website link relevant to or irrelevant to verification of the sensitive operation.

Optionally, after the sending, by a second terminal device, a sensitive operation request to a sensitive operation server, the method further includes:

receiving, by the second terminal device, a verification result from the verification server, and displaying a processing result of the sensitive operation on a first terminal device and/or the second terminal device according to the verification result.

Figure 5:
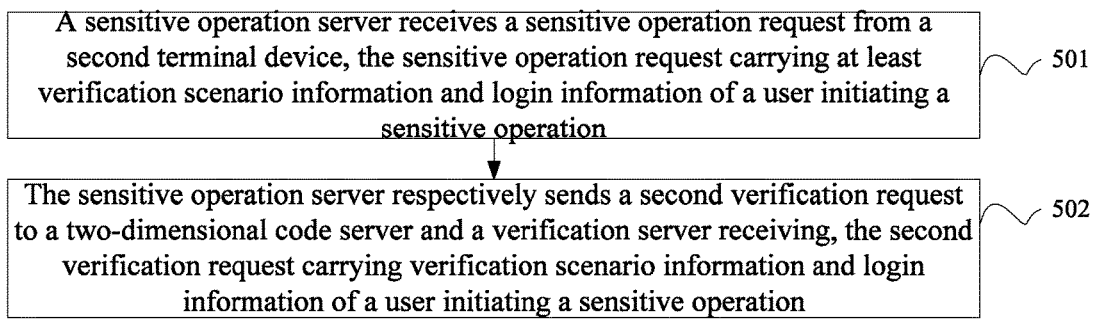
FIG. 5 is a flowchart of a method for verifying sensitive operations according to an embodiment of the disclosure.

FIG. 5 is a flowchart of a method for verifying sensitive operations according to an embodiment of the disclosure. Referring to FIG. 5, the method according to this embodiment specifically includes:

Step 501: receiving, by a sensitive operation server, a sensitive operation request from a second terminal device, the sensitive operation request carrying at least verification scenario information and login information of as user initiating a sensitive operation; and Step 502: respectively sending, by the sensitive operation server, a second verification request to a two-dimensional code server and a verification server, the second verification request carrying the verification scenario information and the login information of the user initiating, the sensitive operation, such that the verification server sends a verification code to the two-dimensional code server, whereupon the two-dimensional code server generates a two-dimensional code according to the verification scenario information, the login information of the user initiating the sensitive operation, and the verification code.

Optionally, the login information is account information or at user identifier.

Optionally, the sensitive operation request further carries organization information and/or service identifier information.

Figure 6:
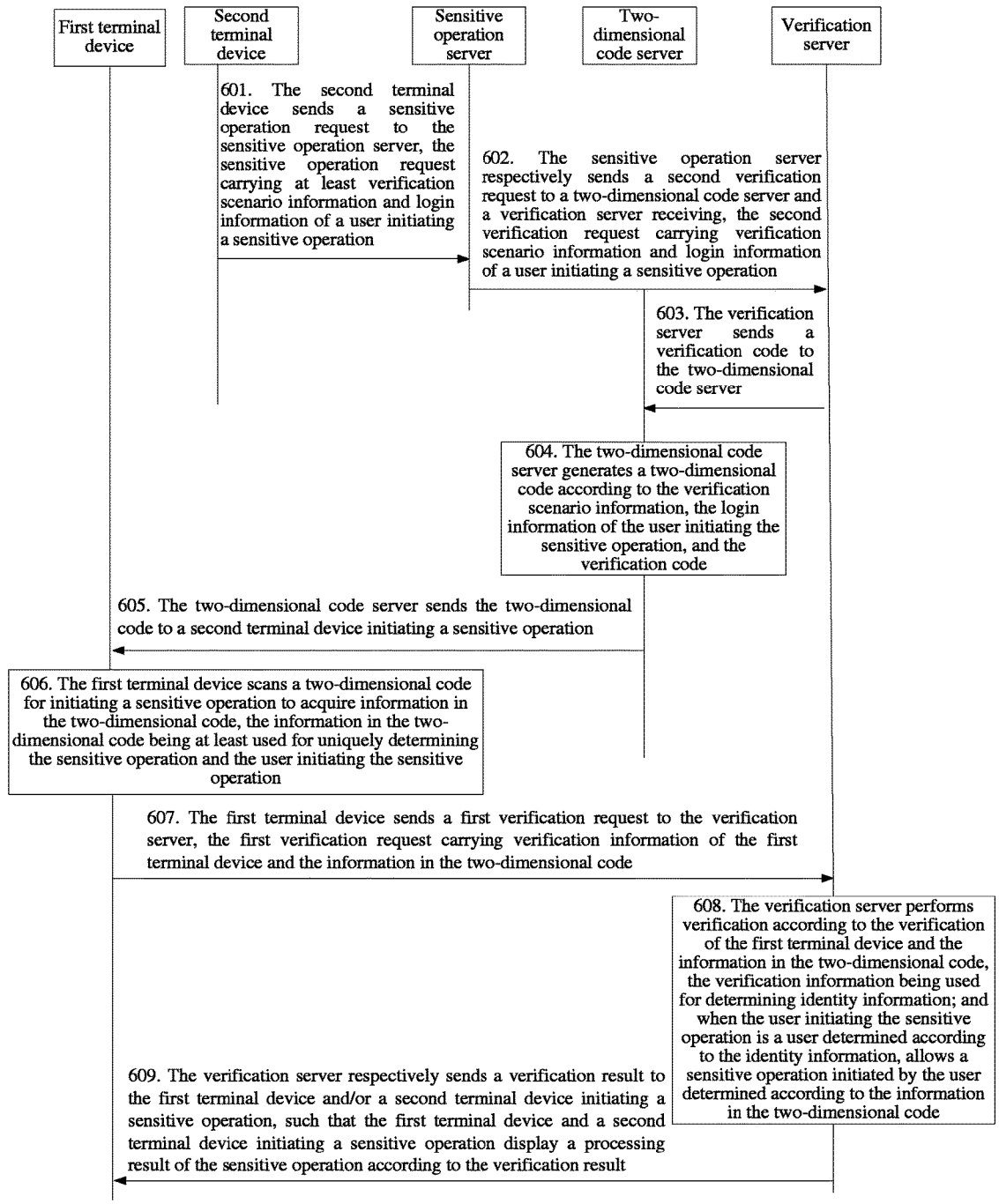
FIG. 6 is a flowchart of a method for verifying sensitive operations according to an embodiment of the disclosure.

FIG. 6 is a flowchart of a method for verifying sensitive operations according to an embodiment of the disclosure. The interaction subjects in this embodiment are as first terminal device, a second terminal device, a sensitive operation server, a two-dimensional code server, and a verification server. Referring to FIG. 6, the method according to this embodiment specifically includes:

Step 601: A second terminal device sends a sensitive operation request to a sensitive operation server, the sensitive operation request carrying at least verification scenario information and login information of a user initiating a sensitive operation.

The sensitive operation mainly refers to a privacy or account-related operation performed by a terminal device user. Such an operation causes great impacts in operation scenarios of changes related to security, privacy, property, and permission of the user, for example, net-banking-based cash remittance, play equipment transfer, password change, encryption tool replacement, and the like. This embodiment sets no limitation thereto. For example, using a scenario of net-banking-based transfer or payment as an example, in this scenario, the sensitive operation refers to the net-banking-based transfer or payment, which may be verified by scanning a two-dimensional code by the first terminal device.

The verification scenario information refers to information related to the sensitive operation, such as, a source of the sensitive operation, for example, a website, specific content of the sensitive operation, for example, a payment item. With respect to the sensitive operation, the specific verification scenario information varies with the typo of the sensitive operation, which is not described herein any further.

The login information of the user initiating the sensitive operation may refer to account information using which the user logs in to the second terminal device, for example, user name and password. When the user logs in to an application or a website which involves a sensitive operation over the second terminal device, for example, a payment-specific application or a shopping website, account information may be input over a login window of the application or a login interface of the website, such that the second terminal device acquires the login information of the user initiating the sensitive operation.

Alternatively, the login information of the user initiating the sensitive operation may refer to an identifier of the user logging in to the second terminal device, where the user identifier may be assigned by a server during registration of the user, and may be used for uniquely identifying the user.

The user identifier may be used for indicating login status of the user. When the sent sensitive operation request carries the user identifier, the user has been lowed in and when no user identifier is carried, the user has not been logged in. In addition, according to network protocols or system requirements, the login information may further includes any one of user identifiers and the login status. For example, when the sent sensitive operation request carries the user identifier, and the login status is identified by "1", the user has been logged in, and when the user identifier is carried, but the login status is identified by "0", the user has not been logged in. Still, for example, when the login status carried in sent operation request is identified by "1", the user has been logged in; and when the login status is identified by "0", the user has not been logged in.

Further, the sensitive operation request may further carry service identifier information in addition to the verification scenario information. The service identifier information is used for differentiating different service scenarios, and different service scenarios have different service identifier information. Each piece of the service identifier information may be used for uniquely identifying a service scenario. With respect to different service identifier information, the sensitive operation server may sends a verification request to different verification servers according to the service identifier information carried in the sensitive operation request. Nevertheless, if the verification system includes only one verification server, the sensitive operation server sends a verification request to the verification server, such that the verification server issues a verification code according to the service identifier information.

Further, the sensitive operation request may further carry organization information in addition to the verification scenario information, where the organization information may be used for uniquely identifying an operator providing the sensitive operation. For example, using, a scenario of net-banking-based transfer or payment, the organization information is used for uniquely identifying a bank where the transfer transaction is carried out; and with respect to a scenario of logging in to a website, the organization information is used for uniquely identifying an operator of the website.

Step 602: The sensitive operation server respectively sends a second verification request to a two-dimensional code server and a verification server, the second verification request carrying verification scenario information and login information of a user initiating a sensitive operation.

The two-dimensional code server is a server capable of generating a two-dimensional code according to the verification scenario information and the login information of the user initiating the sensitive operation. The verification server is a server capable of issuing a verification code and performing verification according to the received information and the issued verification code.

Step 603: The verification server sends a verification code to the two-dimensional code server.

Upon receiving a second verification request, the verification server sends a verification code to the two-dimensional code server. It should be noted that the verification server may randomly generate a verification code, for example, a random code, and may further generate a verification code according to information carried in the received second verification request, for example, an encrypted character string, which is not limited in this embodiment.

Further, when the verification system includes a plurality of service servers providing different services, each of the service servers may be uniquely identified by service identifier information. Therefore, step 603 may be replaced by the following step; The verification server sends a verification code to a service server corresponding to the service identifier information carried in the second verification request, and the service server sends the verification code to the two-dimensional code server.

It should be noted that, this embodiments of the disclosure are described only using a scenario where the verification server sends a two-dimensional code to the two-dimensional code server as an example. Whereas in another embodiment of the disclosure, when receiving the second verification request, the verification server may determine, according to the verification scenario information and/or the login information of the user initiating the sensitive operation carried in the second verification request, an object server to which the verification code is to be sent. Specifically, the following three cases are involved, (1) The verification server is provided with a mapping relationship between verification scenario information and object servers, and the verification server, upon receiving the verification scenario information, acquires the corresponding object server from the mapping relationship according to the verification scenario information, and sends the verification code to the object server, such that the object server proceeds with the verification process according to the received verification code. For example, if the verification scenario information is used to indicate a login scenario, assuming that the object server corresponding to the login scenario information is a dynamic code server, a random verification code is issued to the dynamic code server such that the dynamic code server generates a dynamic verification code, provides the dynamic verification code to the user via the login interface, and sends the dynamic verification code subsequently entered by the user to the verification server such that the verification server verifies the user identity according to the dynamic verification code. (2) The verification server is provided with a mapping relationship between login information (for example, account information and user identifier) and object servers, and the verification server, upon receiving the login information, acquires the corresponding object server from the mapping relationship according to the login information, and sends the verification code to the object server, such that the object server proceeds with the verification process according to the received verification code. It should be noted that the mapping relationship between login information and object servers may be defaulted on the verification server or configured by the user, or alternatively may be generated according to a historically selected verification mode with respect to the login information. For example, when the user has frequently selected the same verification mode in practice, a mapping relationship between the login information of the user and the object server in the verification mode is generated. For example, assuming that the object server corresponding to the login information is a face detection server, a random verification code is issued to the face detection server such that the face detection server implements the verification process. (3) The verification server is provided with a mapping relationship between both login information (for example, account information and user identifier) and verification scenario information, and object servers, and upon receiving the login information, the verification server acquires the corresponding object server from the mapping relationship according to the login information and the verification scenario information, and sends the verification code to the object server, such that the object server proceeds with the verification process according to the received verification code. The object server may be a dynamic code verification server, a face verification server, a short message verification server, or the like.

Step 604: The two-dimensional code server generates a two-dimensional code according to the verification scenario information, the login information of the user initiating the sensitive operation, and the verification code, information in the two-dimensional code at least being used for uniquely determining the sensitive operation and the user initiating the sensitive operation.

The information in the two-dimensional code includes the verification scenario information, the information of the user initiating the sensitive operation, and the verification code.

The information in the two-dimensional code further includes at least one of: organization information, service identifier information, and two-dimensional code identifier information. The information contained in the two-dimensional code corresponds to the information carried in the second verification request. When the second verification request carries only the verification scenario information, the information in the generated two-dimensional code includes the verification code, the verification scenario information, and the identifier information of the two-dimensional code. When the second verification code further carries the organization information and/or the service identifier information, the information in the generated two-dimensional code includes the verification code, the organization information and/or the service identifier information, the verification scenario information, and the identifier information of the two-dimensional code. The identifier information of the two-dimensional code may be used for identifying the two-dimensional code server, such that the two-dimensional code server is verified during the subsequent verification.

The two-dimensional code, also referred to as a two-dimensional barcode, records data symbol information using a white and black pattern formed by regularly arranging specific geometric graphs on a plane (in a two-dimensional direction). In code formulation, the concept of bit streams of "0" and "1" constituting a computer internal logic basis is smartly used, and several geometric graphs corresponding to binary are used to represent text value information. The information is automatically identified and read using an image input device or a photoelectric scanning device, thereby implementing automatic information processing. The two-dimensional code and the barcode technology have some common features: Each code system has its specific character set; each character occupies a specific width; and the check function is implemented. Additionally, the two-dimension code implements functions of automatically identifying information in different rows, and processing rotation changes of the pattern.

Further, the information in the two-dimensional code further includes a website link relevant to or irrelevant to verification of the sensitive operation. The website link may be used to provide download and information query services for the user, and may be carried in the second verification request. Upon receiving the second verification request, the two-dimensional code server generates a two-dimensional code according to the website link and other information. Alternatively, the website link may be added by the two-dimensional code server according to server settings. The website link information pertains to extension information, and thus may be not encrypted.

It is simple to establish and implement a two-dimensional code platform. Compared with such a complicated process as short message verification, the operation steps are simplified, and the cost is reduced with the security being improved.

Step 605: The two-dimensional code server sends the two-dimensional code to a second terminal device initiating a sensitive operation.

Using the scenario of shopping in step 601 as an example, when a user of the second terminal device selects desired articles and goes to the payment process, a sensitive operation request is initiated, the two-dimensional code server sends the generated two-dimensional code to the second terminal device, and the second terminal displays the two-dimensional code (the two-dimensional code may pop up when a verification checkbox is clicked in the payment verification stage).

Step 606: The first terminal device scans a two-dimensional code for initiating a sensitive operation to acquire information in the two-dimensional code, the information in the two-dimensional code being at least used for uniquely determining the sensitive operation and the user initiating the sensitive operation.

In this embodiment, an application for the sensitive operation may be installed on the first terminal device, where the application program has a unique application identifier which may also serve as a serial number. The applications installed for different users have different application identifiers. With respect to the application installed for the user, each user has a unique user identifier, for example, a user name; and with respect to each terminal device where the application is installed, the terminal device also has a unique device identifier, such as a mobile phone serial number, a mobile phone number, and the like. The user of the terminal device has made registration using the application. When running the application and scanning the two-dimensional code, the first terminal device may acquire the verification code in the two-dimensional code and the verification scenario information. Further, first terminal device may send the acquired verification scenario information to the user of the first terminal device, to prompt the user as whether to perform the sensitive operation. When the user selects to perform the sensitive operation, step 607 is performed; and if the user selects not to perform the sensitive operation, the process ends.

When initially running the application, the first terminal device registers the identity information and the verification information of the first terminal device using a short message or a static password, and determines a binding relationship between the identity information and the verification information. The binding relationship may be implemented in a database, and read by a server involved in the sensitive operation. In addition, the binding relationship may be notified to various servers involved in the sensitive operation, for example, the verification server.

For example, using the Internet-based shopping as an example, a user A, when initially logging in to a website, needs to complete registration according to identity information thereof, i.e., entering such information as email address, mobile phone number, contact address, user name, and password; and subsequently the user A needs to download a shopping application provided on the website, and opens the application and performs an operation. After the operation is completed, the server acquires the identity information of the user A, and binds the user identifier to the identity information of the terminal device where the application is installed. When desiring to shop on the Internet, the user A only needs to open the shopping, application, the application acquires information in the two-dimensional code and completes further verification according to the information in the two-dimensional code.

A person skilled in the art may know that terminals typically have the functions of scanning two-dimensional codes and acquiring information carried therein.

The embodiments of the disclosure are described using a scenario where the terminal device initiating a sensitive operation is different from the terminal device scanning a two-dimensional code as an example. However, in practice, a terminal device may be responsible for both initiating a sensitive operation and scanning a two-dimensional code. In this case, during scanning, the terminal may scan the two-dimensional code using a camera on a handheld device connected to the terminal device, or scan a picture to a local memory and then read the picture.

The first terminal device needs to have both the displaying function and the scanning function. Preferably, the application installed on the first terminal device needs to have the scanning function to scan the acquired two-dimensional code.

It should be noted that the two-dimensional code may be provided over the Internet to the second terminal device and displayed on a webpage opened on the second terminal device, and the two-dimensional code is displayed, to the user, such that the user performs scanning using a terminal device or an application.

Step 607: The first terminal device sends a first verification request to the verification server, the first verification request carrying verification information of the first terminal device and the information in the two-dimensional code.

The verification information of the first terminal device includes at least one of a user identifier, an identifier of the first terminal device, and an application identifier of the first terminal device.

An application has been installed, on the first terminal device, i.e., the user identifier of the first terminal device, the identifier of the first terminal device, and the application identifier of the first terminal device have all been determined. To determine the identity of the user during the subsequent verification process, the first verification request needs to carry any one of the user identifier of the first terminal device, the identifier of the first terminal device, and the application identifier of the first terminal device, such that the verification server is capable of verifying the first terminal device according to the user identifier of the first terminal device, the identifier of the first terminal device, or the application identifier of the first terminal device.

Further, the first verification request sent by the first terminal device may further carry application information, including application installation information, application record, and the like, thereby increasing dimensions of the verification.

The identity information in this embodiment includes but not limited to user name, user attribute, operation record, and the like. The application information includes but not limited to application code, installation time, application record, and the like.

Step 608: The verification server performs verification according to the verification of the first terminal device and the information in the two-dimensional code, the verification information being used for determining identity information; and when the user initiating the sensitive operation is a user determined according to the identity information, allows a sensitive operation initiated by the user, which is determined according to the information in the two-dimensional code.

The verification server judges, according to the login information of the user initiating the sensitive operation and the verification information, whether the login information of the user initiating the sensitive operation is bound to the verification information; if true, judges that the user initiating the sensitive operation is the user determined according to the identity information; and otherwise, judges that the user initiating the sensitive operation is not the user determined according to the identity information.

According to the verification information of the first terminal device, the identity information bound to the verification information may be acquired, and the intimation in the two-dimensional code is at least used for determining the sensitive operation and the user initiating the sensitive operation. If the verification is successful, when the user initiating the sensitive operation is a user determined according to the identity information, a sensitive operation corresponding, to the identity information and determined according to the information in the two-dimensional code is allowed. This further enhances security of the identity verification, and further reduces risks of privacy leakage and account thefts since no private information of the user is transmitted during interaction between the terminal device and the server.

Upon receiving the first verification request from the first terminal device, the verification server judges, according to the verification information of the first terminal device and the login information in the two-dimensional code carried in the first verification request, whether the user of the first terminal device is the same as the user initiating the sensitive operation, verifies the identity information of the first terminal device according to the verification information of the first terminal device, and verifies each piece of information in the two-dimensional code. If verification of any piece of information encounters an error, verification of the first terminal device fails; when verification of all pieces of information is successful, verification of the first terminal device is successful, and the sensitive operation, such as payment and password change, is allowed. It should be noted that the verification server may be a functional module on a server performing the sensitive operation, or may be a server independent of the server performing the sensitive operation.

When the first verification request sent by the first terminal device further carries application information, verification is further performed according to the application information carried in the first verification request and the application information stored on the verification server.

Based on the scenario of shopping in step 601, the payment operation may be completed by scanning the two-dimensional code using a device such as a mobile phone or a mobile terminal (for example, scanning using a mobile phone with an application installed).

Step 609: The verification server respectively sends a verification result to the first terminal device and/or a second terminal device initiating a sensitive operation, such that the first terminal device and a second terminal device initiating a sensitive operation display as processing result of the sensitive operation according to the verification result.

Further, the first terminal device receives a verification result from the verification server, and displays a processing result of the sensitive operation thereon according to the verification result.

Further, the second terminal device receives a verification result from the verification server, and displays a processing result of the sensitive operation thereon according to the verification result.

Further, the first terminal device and/or the second terminal device stores the processing result, such that history operations may be queried subsequently according to specific content or keywords of the sensitive operations.

By simultaneously notifying the user of the operation and the operation result on interfaces of both the second terminal (for example, a computer) initiating the sensitive operation and the first terminal device (for example, a mobile phone or a tablet computer), phishing can be effectively prevented.

Upon completion of the verification, the verification server simultaneously feeds back the verification result to the user interfaces of the first terminal device and the second terminal device where the application is installed, and, the application records the verification result. In addition, during the process, the service scenario may also be fed back for the application to record. The first terminal device and the second terminal device may display prompt information on the user interfaces thereof, such that the user acquires that the sensitive operation fails.

Further, upon receiving the verification result and performing the sensitive operation according to the verification result, the terminal device may further send an instruction, for example, a delivery instruction, to a website server involved in the current sensitive operation, the instruction carrying the user identifier, such that the website server, upon receiving the instruction, is capable of performing operations according to the user identifier carried in the instruction. For example, upon receiving the delivery instruction, the website server acquires address information in the identity information according to the user identifier carried in the delivery instruction, and delivers user-shopped articles according to address information.

It should be noted that various servers, including the sensitive operation server, the two-dimensional code server, and the verification server, described in the above-described embodiments may be independent servers, or may be different functional modules on the same server. Nevertheless, these servers may be servers implementing different functions in a server cluster.

According to the technical solutions provided in the disclosure, terminal device verification and identity verification are introduced to and combined with a traditional verification manner using a two-dimensional code, greatly simplifying user's operations; during operation by the user, user identity is further verified, effectively improving security assurance, preventing counterfeit of user's account and leakage of user's account, and simplifying the process of a sensitive operation.

To further reveal the advantages of the embodiments of the disclosure over the prior art, a conventional shopping website is used as an example for description.

Conventional Internet-based shopping involves the following steps: 1. opening a browser; 2. logging, in to www.taobao.com or www.tmall.com; 3. selecting a commodity; 4. confirming payment; 5. verifying the payment; 6. completing the transaction. Contrarily, according to the embodiments of the disclosure, such a shopping process involves only four steps: 1. opening a browser (in some cases, this step is not necessary and may be skipped over); 2. selecting a commodity; 3. completing payment by scanning a two-dimensional code; 4. completing the transaction. Obviously, according to the disclosure, the conventional shopping steps are reduced by 60%. In addition, a process of user identity verification is added such that the payment process is more secure and reliable.

Figure 7:
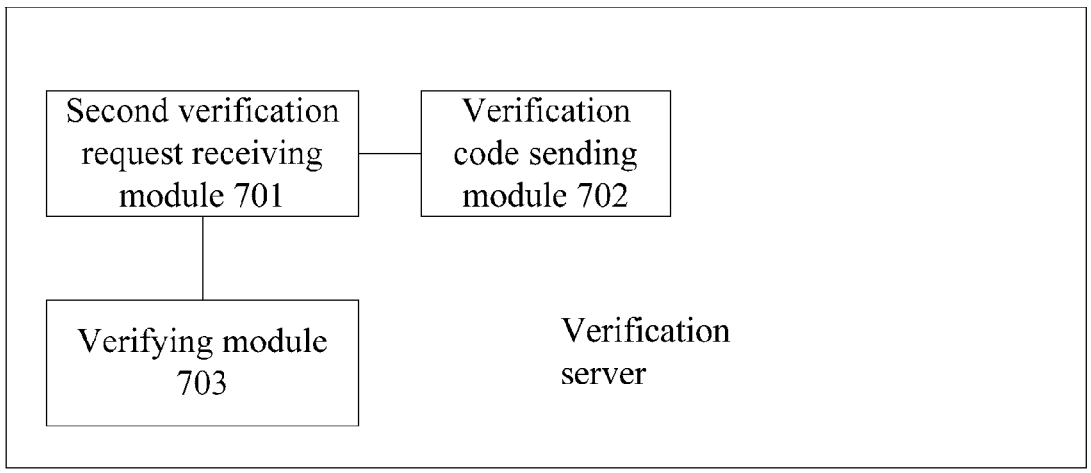
FIG. 7 is a schematic structural diagram of a verification server according to an embodiment of the disclosure.

FIG. 7 is a schematic structural diagram of a verification server according to an embodiment of the disclosure. Referring to FIG. 7, the verification server specifically includes:

a second verification request receiving module 701, configured to receive a second verification request from a sensitive operation server, the second verification request carrying verification scenario information and login information of a user initiating a sensitive operation;

a verification code sending module 702, configured to send a verification code to a two-dimensional code server, such that the two-dimensional code server generates a two-dimensional code according to the verification scenario information, the login information of the user initiating the sensitive operation, and the verification code, information in the two-dimensional code being at least used for uniquely determining the sensitive operation and the user initiating the sensitive operation; and a verifying module 703, configured to: upon receiving a first verification request from a first terminal device, the first verification request carrying verification information of the first terminal device and the information in the two-dimensional code, perform verification according to the verification information of the first terminal device and the information in the two-dimensional code, the verification information being used for determining identity information; and when the user initiating the sensitive operation is a user determined according to the identity information, allow a sensitive operation initialed by the user, which is determined according to the information in the two-dimensional code.

Optionally, the verifying module 703 is specifically configured to: judge, according to the login information of the user initiating the sensitive operation and the verification information, whether the login information of the user initiating the sensitive operation is bound to the verification information; if true, judge that the user initiating the sensitive operation is the user determined according to the identity information; and otherwise, judge that the user initiating the sensitive operation is not the user determined according to the identity information.

The verification server further includes: a registering module, configured to register the identity information and the verification information of the first terminal device to determine a binding relationship between the identity information and the verification information.

Optionally, the information in the two-dimensional code includes at least one of: organization information, service identifier information, verification scenario information, two-dimensional code identifier information.

Optionally; the information in the two-dimensional code further includes a website link relevant to or irrelevant to verification of the sensitive operation.

Optionally, the server further includes:

a verification result sending module, configured to respectively send a verification result to the first terminal device and/or a second terminal device initiating a sensitive operation, such that the first terminal device and the second terminal device initiating a sensitive operation display a processing result of the sensitive operation according to the verification result.

Figure 8:
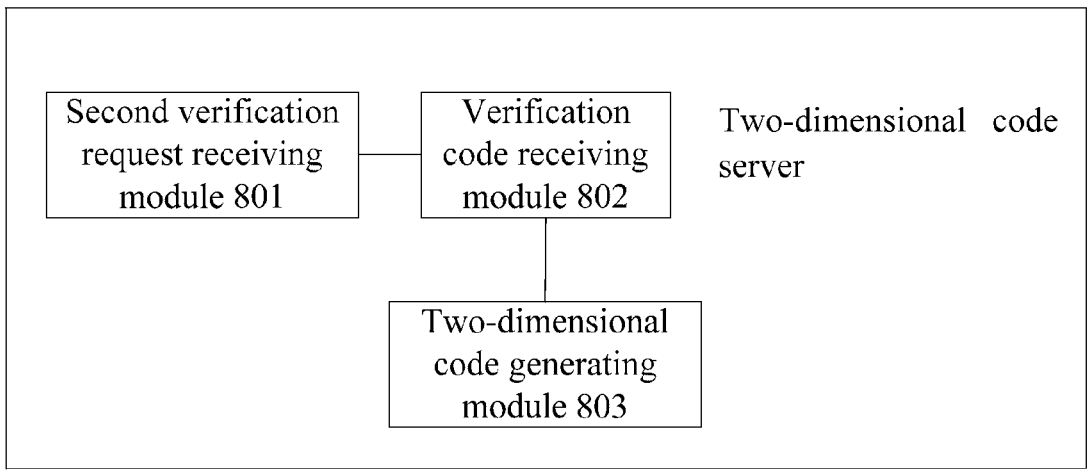
FIG. 8 is a schematic structural diagram of a two-dimensional code server according to an embodiment of the disclosure.

FIG. 8 is a schematic structural diagram of a two-dimensional code server according to an embodiment of the disclosure. Referring to FIG. 8, the two-dimensional code server specifically includes:

a second verification request receiving module 801, configured to receive a second verification request from a sensitive operation server, the second verification request carrying verification scenario information and login information of a user initiating a sensitive operation;

a verification code receiving module 802, configured to receive a verification code from a verification server; and a two-dimensional code generating module 803, configured to generate a two-dimensional code according to the verification scenario information, the login information of the user initiating the sensitive operation, and the verification code, information in the two-dimensional code being at least used for uniquely determining the sensitive operation and the user initiating the sensitive operation.

Optionally, the login information is account information or a user identifier.

Optionally, the information in the two-dimensional code includes at least one of: organization information, service identifier information, verification scenario information, two-dimensional code identifier information.

Optionally, the information in the two-dimensional code further includes a website link relevant to or irrelevant to verification oldie sensitive operation.

Figure 9:
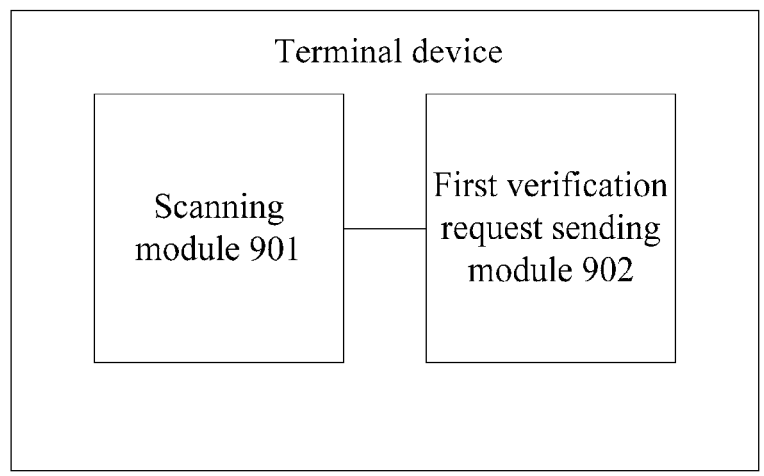
FIG. 9 is a schematic structural diagram of a terminal device according to an embodiment of the disclosure.

FIG. 9 is a schematic structural diagram of a terminal device according to an embodiment of the disclosure. Referring to FIG. 9, the terminal device specifically includes:

a scanning module 901, configured to scan a two-dimensional code for initiating a sensitive operation to acquire information in the two-dimensional code, the information in the two-dimensional code being at least used for uniquely determining the sensitive operation and the user initiating the sensitive operation; and a first verification request sending module 902, configured to send as first verification request to a verification server, the first verification request carrying verification information of the terminal device and the information in the two-dimensional code, such that the verification server performs verification according to the verification information of the terminal device and the information in the two-dimensional code, the verification information being used for determining identity information; and when the user initiating the sensitive operation is a user determined by the identity information, allow a sensitive operation initiated by the user, which is determined according to the information in the two-dimensional code.

Optionally, the terminal device further includes:

a registering module, configured to register the identity information and the verification information of the terminal device to determine a binding relationship between the identity information and the verification information.

Optionally, the verification information of the terminal device includes at least one of: a user identifier, an identifier of the terminal device, and an application identifier of the terminal device.

Optionally, the two-dimensional code is provided by a second terminal device initiating a sensitive operation.

Optionally, the information in the two-dimensional code includes at least one of organization information, service identifier information, verification scenario information, two-dimensional code identifier information.

Optionally, the information in the two-dimensional code further includes a website link relevant to or irrelevant to verification of the sensitive operation.

Optionally, the terminal device further includes:

a processing result displaying module, configured to receive a verification result from the verification server, and display a processing result of the sensitive operation on the terminal device and/or the second terminal device according to the verification result.

Figure 10:
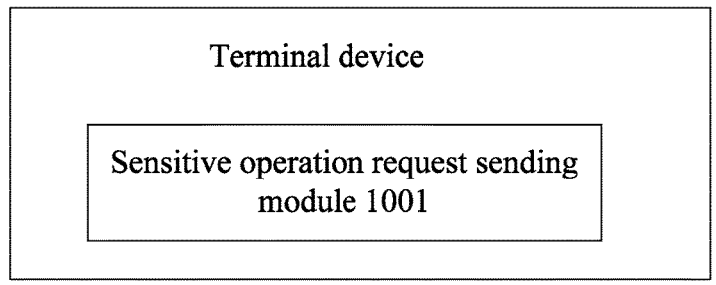
FIG. 10 is a schematic structural diagram of a terminal device according to an embodiment of the disclosure.

FIG. 10 is a schematic structural diagram of a terminal device according to an embodiment of the disclosure. Referring to FIG. 10, the terminal device specifically includes:

a sensitive operation request sending module 1001, configured to send a sensitive operation request to a sensitive operation server, the sensitive operation request carrying at least verification scenario information and login information of a user initiating a sensitive operation, such that the sensitive operation server respectively sends a second verification request to a two-dimensional server and a verification server, the second verification request carrying the verification scenario information and the login information of the user initiating the sensitive operation, such that the verification server sends a verification code to the two-dimensional code server, whereupon the two-dimensional code server generates a two-dimensional code according to the verification scenario information, the login information of the user initiating the sensitive operation, and the verification code.

Optionally, the sensitive operation request further carries organization information and service identifier information.

Optionally, the information in the two-dimensional code includes at least one of organization information, service identifier information, verification scenario information, two-dimensional code identifier information.

Optionally, the information in the two-dimensional code further includes a website link relevant to or irrelevant to verification of the sensitive operation.

Optionally, the terminal device further includes:

a processing result displaying module, configured to receive a verification result from the verification server, and display a processing result of the sensitive operation on the first terminal device and/or the terminal device according to the verification result.

Figure 11:
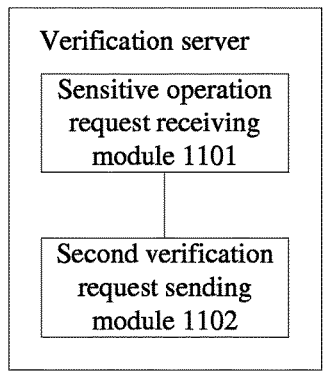
FIG. 11 is a schematic structural diagram of a sensitive operation server according to an embodiment of the disclosure.

FIG. 11 is a schematic structural diagram of a sensitive operation server according to an embodiment of the disclosure. Referring to FIG. 11, the sensitive operation server specifically includes:

a sensitive operation request receiving module 1101, configured to receive a sensitive operation request from a second terminal device, the sensitive operation request carrying at least verification scenario information and login information of a user initiating a sensitive operation; and a second verification request sending module 1102, configured to respectively send a second verification request to a two-dimensional code server and a verification server, the second verification request carrying the verification scenario information and the login information of the user initiating the sensitive operation, such that the verification server sends a verification code to the two-dimensional code server, whereupon the two-dimensional code server generates a two-dimensional code according to the verification scenario information, the login information of the user initiating the sensitive operation, and the verification code.

Optionally, the login information is account information or a user identifier.

Optionally, the sensitive operation request further carries organization information and/or service identifier information.

Figure 12:
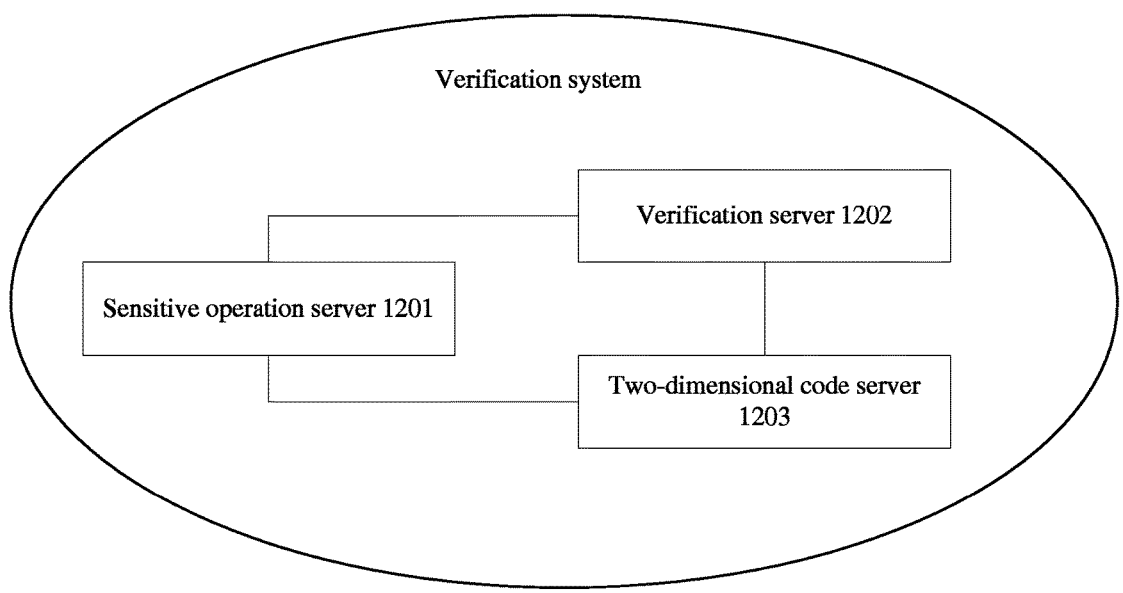
FIG. 12 is a schematic structural diagram of a verification system according to an embodiment of the disclosure.

FIG. 12 is a schematic structural diagram of a verification system according to an embodiment of the disclosure. Referring to FIG. 12, the verification system specifically includes: a sensitive operation server 1201, a verification server 1202, and a two-dimensional code server 1203; where:

the sensitive operation server 1201 is configured to: receive a sensitive operation request from a second terminal device, the sensitive operation request carrying at least verification scenario information and login information of a user initiating a sensitive operation; and respectively send a second verification request to the two-dimensional code server and the verification server, the second verification request carrying the verification scenario information and the login information of the user initiating the sensitive operation, such that the verification server sends a verification code to the two-dimensional code server, whereupon the two-dimensional code server generates a two-dimensional code according to the verification scenario information, the login information of the user initiating the sensitive operation, and the verification code;

the verification server 1202 is configured to: receive the second verification request from the sensitive operation server, the second verification request carrying the verification scenario information and the login information of the user initiating the sensitive operation; send the two-dimensional code to the two-dimensional code server, such that the two-dimensional verification server generates the two-dimensional code according to the verification scenario information, the login information of the user initiating the sensitive operation, and the verification information, the information in the two-dimensional code being at least used for uniquely determining the sensitive operation and the user initiating the sensitive operation; upon receiving a first verification request from a first terminal device, the first verification information carrying verification of the first terminal device and the information in the two-dimensional code, perform verification according to the verification information of the first terminal device and the information in the two-dimensional code, the verification information being used for determining identity information; and when the user initiating the sensitive operation is a user determined according to the identity information, allow a sensitive operation initiated by the user, which is determined according to the information in the two-dimensional code; and the two-dimensional code server 1203 is configured to: receive the second verification request from the sensitive operation server, the second verification request carrying the verification scenario information and the login information of the user initiating the sensitive operation; receive the verification code from the verification server; and generate the two-dimensional code according to the verification scenario information, the login information of the user initiating the sensitive operation, and the verification code, the information in the two-dimensional code being at least used for uniquely determining the sensitive operation and the user initiating the sensitive operation.

Various terminal devices and servers according to the embodiments of the disclosure are based on the same inventive concept and implementation mechanism as the method embodiments. The details can be referred to the descriptions of the method embodiments, which are thus not described herein any further.

It should be noted that, during verification of sensitive operations, the terminal devices and servers according to the above embodiments are described by only using division of the above functional modules for description. In practice, the functions may be assigned to different functional modules for implementation as required. To be specific, the internal structure of the device is divided into different functional modules to implement all or part of the above-described functions. In addition, the terminal devices and servers provided in the above-described embodiments are based on the same inventive concept as the method for verifying sensitive operations, where the specific implementation is elaborated in the method embodiments, which is not be detailed herein any further.

Figure 13:
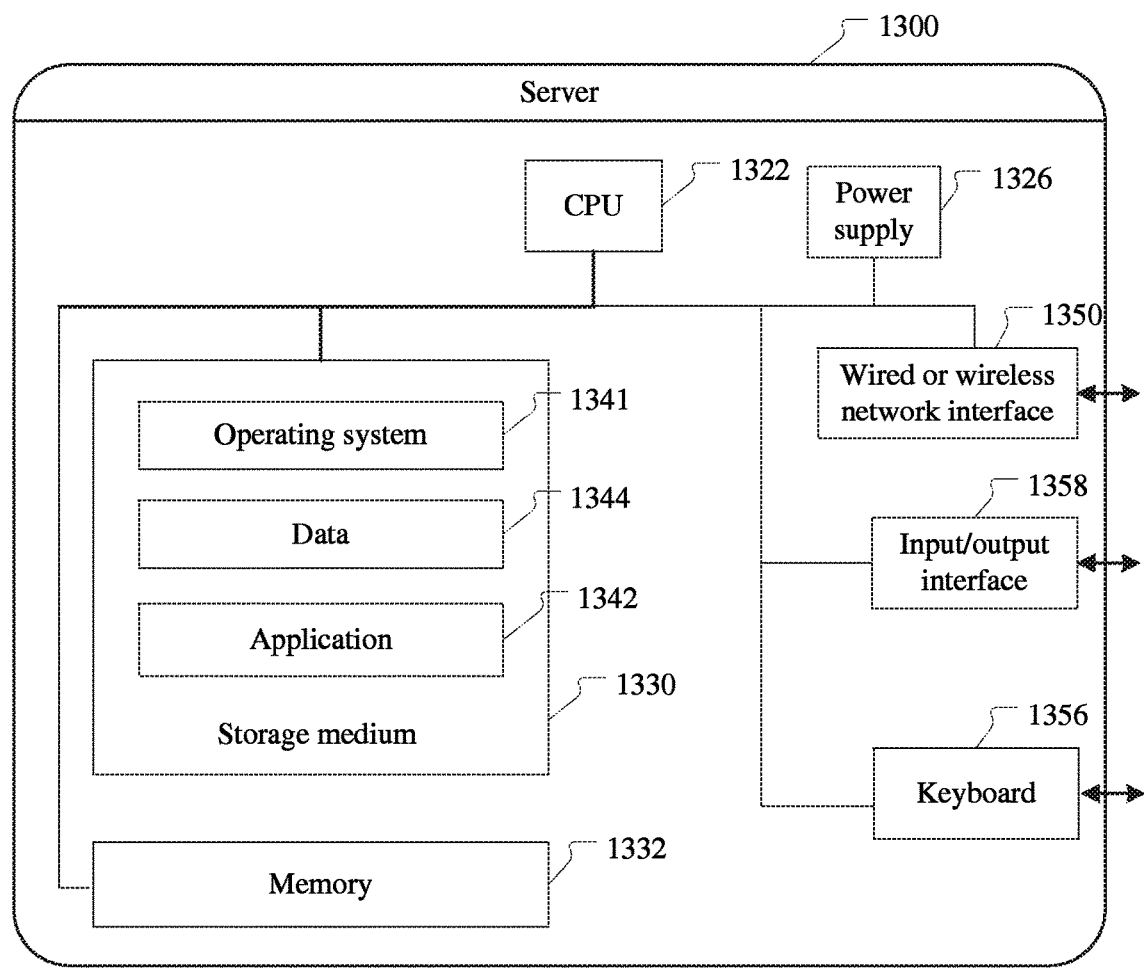
FIG. 13 is a schematic structural diagram of a server according to an embodiment of the disclosure.

The server may be implemented based on the structure of a server 1300 illustrated in FIG. 13. The server 1300 may function differently depending on configuration or performance, and may include at least one central processing unit (CPU) 1322 (for example, at least one processor), a memory 1332, at least one storage medium 1330 (for example, at least one mass storage device) for storing an application 1342 or data 1344. The memory 1332 and the non-transitory storage medium 1330 may be used for non-transitory storage or permanent storage. Programs stored in the storage medium 1330 may include at least one module (now shown in the drawing), where each module may include a series of operation instructions to be executed on the server. Further, the CPU 1332 may be set as communicating with the storage medium 1330, and executing the operation instructions included in the storage medium 1330 on the server 1300.

The server 1300 may further include at least one power supply 1326, at least one wired or wireless network interface 1350, at least one input/output interface 1358, at least one keyboard 1356, and/or at least one operating system 1341, for example, Windows Server™, Mac OS X™, Unix™, Linux™, FreeBSD™, and the like.

Figure 14:
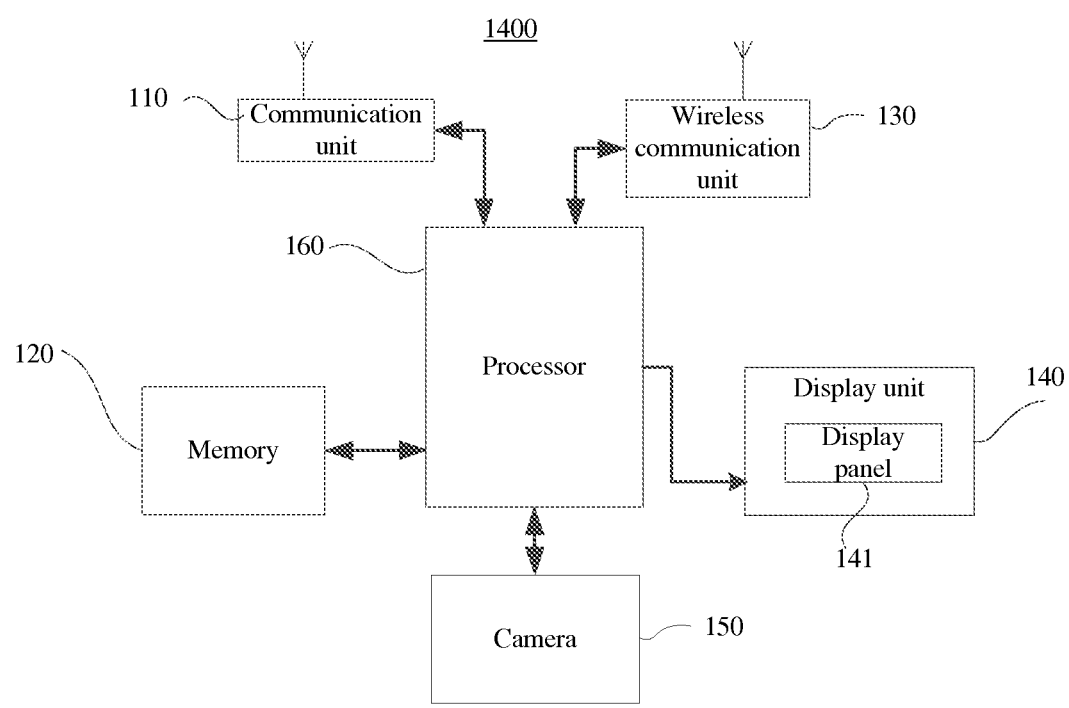
FIG. 14 is a schematic structural diagram of a terminal device according to an embodiment of the disclosure.

The terminal device (may be a first terminal device or a second terminal device) may be implemented based on the structure of a terminal device 1400 illustrated in FIG. 14. Referring to FIG. 14, the terminal device 1400 may further include such components as a communication unit 110, a memory 120 including at least one computer-readable storage medium, a wireless communication module 130, a display unit 140, and a processor 160 including at least one processing cores. A person skilled in the art may understand that the structure of the terminal device as illustrated in FIG. 13 and FIG. 14 does not construe a limitation on the terminal device. The terminal device may include MOTO components over those illustrated in FIG. 13 and FIG. 14, or combinations of some components, or employ different component deployments.

The communication unit 110 may be configured to receive and send messages, or receive and send signals during a call, and may be such a network communication devices as a radio frequency (RF) circuit, a router, and a modem. Particularly, when the communication unit 110 is an RF circuit, after receiving downlink data from a base station, the communication unit 110 hands the received information over to the at least one processor 160, and additionally sends uplink data to the base station. Typically, the RF circuit serving as the communication unit includes, but not limited to, an antenna, at least one amplifier, a tuner, at least one oscillator, a subscriber identity module (SIM) card, a transceiver, a coupler, a low noise amplifier (LNA), a duplexer, and the like. In addition, the communication unit 110 may also communicate with another network or device using wireless communication. The wireless communication can use any communication standard or protocol, including but not limited to: global system for mobile communications (GSM), general packet radio service (GPRS) code division multiple access (CDMA), wideband code division multiple access (WCDMA), long term evolution (LTE), email, short messaging service (SMS), and the like. The memory 120 may be configured to store a software program and a module; the processor 160 executes various function applications and data processing by running the software program and module stored in the memory 120. The memory 120 mainly includes a program storage partition and a data storage partition. The program storage partition may store an operating system, at least one application for implementing a specific function (for example, audio playing function, image playing function, and the like). The data storage partition may store data created according to use of the terminal device 1400 (for example, audio data, address book, and the like). In addition, the memory 120 may include a high speed random access memory, or include a non-volatile memory, for example, at least one disk storage device, a flash memory device, or another non-volatile solid storage device. Correspondingly, the memory 120 may further include storage controller, to provide access to memory 120 for processor 160 and input unit 130.

The display unit 140 may be configured to display information input by the user or information provided to the user, and various graphical user interfaces of the terminal device 1400. These graphical user interfaces may be formed by graphics, texts, icons, and videos or any combination thereof. The display unit 140 may include a display panel 141. Optionally, the display panel 141 may be configured by using a liquid crystal display (LCD), an organic light-emitting diode (OLED) or the like.

The terminal device 1400 may further include a camera 150, where the camera 150 is configured to collect an image, and send the collected image to the processor 160 for processing, for example, extracting information scanned from a two-dimensional code.

To implement wireless communication, the terminal device may be configured with a wireless communication unit 130, where the wireless communication unit 130 may be a Wi-Fi module. WiFi is a short-distance wireless transmission technology. The terminal device 1400 facilitates user's receiving and sending emails, browsing webpages, and accessing streaming media, by using the wireless communication unit 130. The wireless communication unit provides wireless broadband Internet access services for users. Although FIG. 14 illustrates the wireless communication unit 130, it may be understood that the wireless communication unit is not a necessary component for the terminal device, and may be omitted as required within the essence and scope of the disclosure.

The processor 160 is a control center of the terminal device 1400, and connects all parts of a mobile phone by using various interfaces and lines, and implements various functions and data processing of the terminal device 1400 to globally monitor the mobile phone, by running or performing software programs and/or modules stored in the memory 120 and calling data stored in the memory 120. Optionally, the processor 160 may include at least one processor core. Preferably, the processor 160 may integrate an application processor and a modem processor, where the application processor is mainly responsible for processing the operating system, user interface, and application program; and the modem processor is mainly responsible for performing, wireless communication. It may be understood that the modem processor may also not be integrated in the processor 160.

A person skilled in the art should understand that all or part of steps of the preceding methods may be implemented by hardware or hardware following instructions of programs. The programs may be stored in a non-transitory computer-readable storage medium and may be executed by at least one processor. The storage medium may be a read-only memory, a magnetic disk, or a compact disc-read only memory.

Described above are merely preferred embodiments of the disclosure, but are not intended to limit the disclosure. Any modification, equivalent replacement or improvement made without departing from the spirit and principle of the disclosure should fall within the protection scope of the disclosure.

What is claimed is:

1. A method for verifying sensitive operations, comprising:

receiving, by a verification server, a second verification request from a sensitive operation server, the second verification request carrying verification scenario information and login information of a user initiating a sensitive operation;

sending, by the verification server, a verification code to a two-dimensional code server, such that the two-dimensional code server generates a two-dimensional code according to the verification scenario information, the login information of the user initiating the sensitive operation, and the verification code, information in the two-dimensional code being at least used for uniquely determining the sensitive operation and the user initiating the sensitive operation; and upon receiving a first verification request from a first terminal device, the first verification request carrying verification information of the first terminal device and the information in the two-dimensional code, performing verification by the verification server according to the verification information of the first terminal device and the information in the two-dimensional code, the verification information being used for determining identity information; and when the user initiating the sensitive operation is a user determined according to the identity information, allowing a sensitive operation initiated by the user, which is determined according to the information in the two-dimensional code.

2. The method according to claim 1, wherein the performing verification by the verification server according to the verification information of the first terminal device and the information in the two-dimensional code comprises:

judging, by the verification server according to the login information of the user initiating the sensitive operation and the verification information, whether the login information of the user initiating the sensitive operation is bound to the verification information, if true, judging that the user initiating the sensitive operation is the user determined according to the identity information, and otherwise, judging that the user initiating the sensitive operation is not the user determined according to the identity information.

3. The method according to claim 1, wherein prior to the receiving, by a verification server, a second verification request from a sensitive operation server, the method further comprises:

registering the identity information and the verification information of the first terminal device to determine a binding relationship between the identity information and the verification information.

4. The method according to claim 1, wherein after the performing verification by the verification server according to the verification information of the first terminal device, the method comprises:

respectively sending a verification result to the first terminal device and/or a second terminal device initiating a sensitive operation, such that the first terminal device and the second terminal device initiating a sensitive operation display a processing result of the sensitive operation according to the verification result.

5. A method for verifying sensitive operations, comprising:
- scanning, by a first terminal device, a two-dimensional code for initiating a sensitive operation to acquire information in the two-dimensional code generated according to verification scenario information, login information of the user initiating the sensitive operation, and a verification code by a two-dimensional code server, the information in the two-dimensional code being at least used for uniquely determining the sensitive operation and the user initiating the sensitive operation; and
- sending, by the first terminal device, a first verification request to a verification server, the first verification request carrying verification information of the first terminal device and the information in the two-dimensional code, such that the verification server performs verification according to the verification information of the first terminal device and the information in the two-dimensional code, the verification information being used for determining identity information; and when the user initiating the sensitive operation is a user determined according to the identity information, allowing a sensitive operation initiated by the user, which is determined according to the information in the two-dimensional code.

6. The method according to claim 5, wherein prior to the scanning, by a first terminal device, a two-dimensional code for initiating a sensitive operation, the method further comprises:
- registering the identity information and the verification information of the first terminal device to determine a binding relationship between the identity information and the verification information.

7. The method according to claim 5, wherein the verification information of the first terminal device comprises at least one of: a user identifier, an identifier of the first terminal device, and an application identifier of the first terminal device.

8. The method according to claim 5, wherein the two-dimensional code is provided by a second terminal device initiating a sensitive operation.

9. The method according to claim 5, wherein after the sending, by the first terminal device, a first verification request to a verification server, the method further comprises:
- receiving, by the first terminal device, a verification result from the verification server, and displaying a processing result of the sensitive operation on the first terminal device and/or the second terminal device according to the verification result.

10. A method for verifying sensitive operations, comprising:
- receiving, by a sensitive operation server, a sensitive operation request from a second terminal device, the sensitive operation request carrying at least verification scenario information and login information of a user initiating a sensitive operation; and
- respectively sending, by the sensitive operation server, a second verification request to a two-dimensional code server and a verification server, the second verification request carrying the verification scenario information and the login information of the user initiating the sensitive operation, such that the verification server sends a verification code to the two-dimensional code server, whereupon the two-dimensional code server generates a two-dimensional code according to the verification scenario information, the login information of the user initiating the sensitive operation, and the verification code.

11. A verification server, comprising:
- a second verification request receiving module, configured to receive a second verification request from a sensitive operation server, the second verification request carrying verification scenario information and login information of a user initiating a sensitive operation;
- a verification code sending module, configured to send a verification code to a two-dimensional code server, such that the two-dimensional code server generates a two-dimensional code according to the verification scenario information, the login information of the user initiating the sensitive operation, and the verification code, information in the two-dimensional code being at least used for uniquely determining the sensitive operation and the user initiating the sensitive operation; and
- a verifying module, configured to: upon receiving a first verification request from a first terminal device, the first verification request carrying verification information of the first terminal device and the information in the two-dimensional code, perform verification according to the verification information of the first terminal device and the information in the two-dimensional code, the verification information being used for determining identity information; and when the user initiating the sensitive operation is a user determined according to the identity information, allow a sensitive operation initiated by the user, which is determined according to the information in the two-dimensional code.

12. The server according to claim 11, wherein the verifying module is configured to: judge, according to the login information of the user initiating the sensitive operation and the verification information, whether the login information of the user initiating the sensitive operation is bound to the verification information; if true, judge that the user initiating the sensitive operation is the user determined according to the identity information; and otherwise, judge that the user initiating the sensitive operation is not the user determined according to the identity information.

13. The server according to claim 11, further comprising:
- a registering module, configured to register the identity information and the verification information of the first terminal device to determine a binding relationship between the identity information and the verification information.

14. The server according to claim 11, further comprising:
- a verification result sending module, configured to respectively send a verification result to the first terminal device and/or a second terminal device initiating a sensitive operation, such that the first terminal device and the second terminal device initiating a sensitive operation display a processing result of the sensitive operation according to the verification result.

15. A terminal device, comprising:
- a scanning module, configured to scan a two-dimensional code for initiating a sensitive operation to acquire information in the two-dimensional code generated according to verification scenario information, login information of a user initiating the sensitive operation, and a verification code by a two-dimensional code server, the information in the two-dimensional code being at least used for uniquely determining the sensitive operation and the user initiating the sensitive operation; and a first verification request sending module, configured to send a first verification request to a verification server, the first verification request carrying verification information of the terminal device and the information in the two-dimensional code, such that the verification server performs verification according to the verification information of the terminal device and the information in the two-dimensional code, the verification information being used for determining identity information; and when the user initiating the sensitive operation is a user determined by the identity information, allow a sensitive operation initiated by the user, which is determined according to the information in the two-dimensional code.

16. The terminal device according to claim 15, further comprising:

a registering module, configured to register the identity information and the verification information of the terminal device to determine a binding relationship between the identity information and the verification information.

17. The terminal device according to claim 15, wherein the verification information of the terminal device comprises at least one of: a user identifier, an identifier of the local terminal device, and an application identifier of the terminal device.

18. The terminal device according to claim 15, wherein the two-dimensional code is provided by a second terminal device initiating a sensitive operation.

19. The terminal device according to claim 15, wherein the information in the two-dimensional code comprises at least one of: organization information, service identifier information, verification scenario information, two-dimensional code identifier information.

20. The terminal device according to claim 15, wherein the information in the two-dimensional code further comprises a website link relevant to or irrelevant to verification of the sensitive operation.

21. The terminal device according to claim 15, further comprising:

a processing result displaying module, configured to receive a verification result from the verification server, and display a processing result of the sensitive operation on the terminal device and/or a second terminal device according to the verification result.

22. A sensitive operation server, comprising:

a sensitive operation request receiving module, configured to receive a sensitive operation request from a second terminal device, the sensitive operation request carrying at least verification scenario information and login information of a user initiating a sensitive operation; and a second verification request sending module, configured to respectively send a second verification request to a two-dimensional code server and a verification server, the second verification request carrying the verification scenario information and the login information of the user initiating the sensitive operation, such that the verification server sends a verification code to the two-dimensional code server, whereupon the two-dimensional code server generates a two-dimensional code according to the verification scenario information, the login information of the user initiating the sensitive operation, and the verification code.

* * * * *